May 17, 1966   J. E. HARMS   3,251,429
VEHICLE BRAKE AND CLUTCH CONTROL ASSEMBLY
Filed Feb. 10, 1964
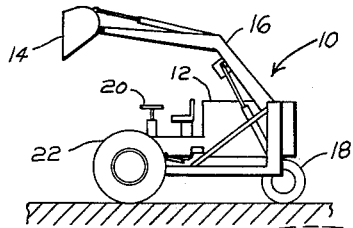
Fig. 1
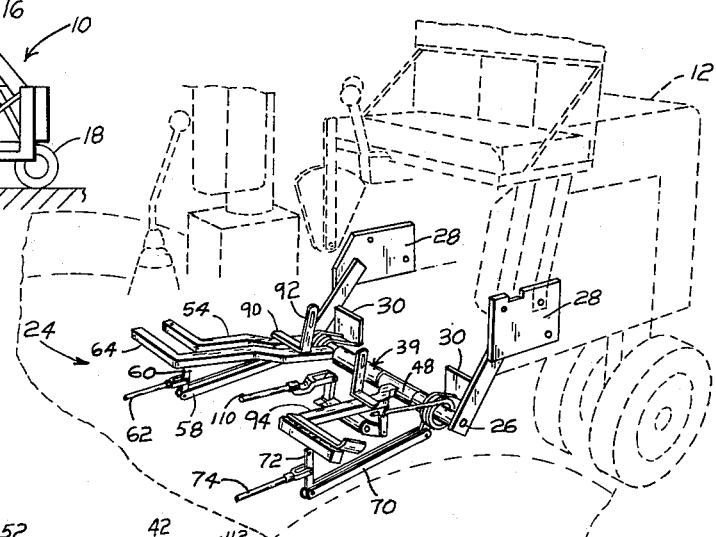
INVENTOR
JACK E. HARMS
BY
Dick & Zarley
ATTORNEYS

United States Patent Office 3,251,429
Patented May 17, 1966

3,251,429
VEHICLE BRAKE AND CLUTCH CONTROL
ASSEMBLY
Jack E. Harms, Everly, Iowa
Filed Feb. 10, 1964, Ser. No. 343,719
10 Claims. (Cl. 180—6.2)

This invention relates to a tractor-loader and in particular to the brake and clutch control assembly.

On the conventional tractor, the spaced apart rear wheels are coupled to the engine of the tractor and the front wheels are connected to the steering wheel. The operator faces the front wheels and sits over the rear wheels. However, in the present invention the driver station has been turned around and the driver faces what is usually called the rear end of the tractor and a scoop is pivoted to what is commonly referred to as the front end of the tractor with its bucket extending rearwardly of the rear end of the tractor. This rearrangement of the conventional operating controls of the tractor includes providing a control assembly for operating the brakes on each of the rear wheels and the clutch connecting the engine to the powered rear wheels.

Accordingly, it is one of the objects of this invention to provide a brake and clutch control assembly for the tractors having driving stations facing rearwardly.

It is a further object of this invention to provide a brake and clutch control assembly which requires a minimum of component parts and occupies a relatively small amount of space but yet is completely accessible to the operator.

Another object of this invention is to provide a brake and clutch control assembly which may be easily assembled and disassembled.

A further object of this invention is to provide a tractor-loader which is simple in design, economical to manufacture and refined in appearance.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a reduced in scale side view of the tractor-loader of this invention;

FIG. 2 is a fragmentary perspective view of the tractor-loader showing the tractor in dash lines and the brake and clutch control assembly in solid lines;

FIG. 3 is a top plan view of the brake and clutch control assembly shown in FIG. 2;

FIG. 4 is an elevational cross-sectional view taken along line 4—4 in FIG. 3 showing in particular the relationship between the parts rotatable on the support shaft; and FIG. 5 is a side elevational cross-sectional view taken along line 5—5 in FIG. 3 and showing in particular the clutch control linkage members.

The tractor-loader of this invention is referred to in FIG. 1 of the drawings by reference numeral 10 and includes a tractor 12 having a scoop 14 movable at the rear end thereof and carried by a pair of lift arms 16 pivoted to the front end of the tractor. The front end of the tractor is characterized by the closely spaced wheels 18 which are operated by the steering wheel 20 and the rear end of the tractor is provided with larger spaced apart driven wheels 22.

The brake and control assembly for the tractor 12 is referred to generally in FIG. 2 by the reference numeral 24. It includes an elongated shaft 26 extending transversely of the line of travel of the tractor and thereunder. It is supported at each of its ends by a pair of frame members 28 bolted to the sides of the tractor. A pair of stop plate elements 30 are welded to the frame members 28 and extend inwardly in parallel relationship to each other and to the shaft 26. The function of these stop members will be subesquently described. The shaft 26 is rigidly secured to the frame members 28 by weld or the like and in turn has a pair of collars 32 and 34 secured to the inner faces of the frame members 28 at opposite ends of the shaft 26. Three separate sleeves are rotatably mounted on the shaft 26, the first of which sleeve 36 has one end in mating engagement with the inner end of the collar 32. A bearing insert 38 is provided between the sleeve 36 and the shaft 26. Next to the sleeve 36 is a sleeve 39 having integral end portions 40 and 42. The end portions 40 and 42 have inner and outer diameters similar to the sleeve 36 while the inner diameter of the center sleeve portion 44 of the sleeve 39 has an inner diameter corresponding to the outer diameter of the sleeve portions 40 and 42. A cutout portion 46 is provided extending through approximately 180 degrees of the center sleeve portion 44. Through this cutout portion 46 a third sleeve 48 having inner and outer diameters similar to the sleeve 36 and sleeve portion 40 and 42 is mounted on the shaft 26. Bearing inserts 50 are provided in each of the sleeve portions 40 and 42 and similarly a bearing insert 52 is mounted on the shaft 26 within the sleeve 48.

As best shown in FIG. 3, a brake pedal arm 54 is welded to the outer peripheral face of the sleeve 36. Directly below the inner end of the brake pedal 54 a post 56 is welded to the sleeve 36. A pair of elongated push-pull plates 58 are pivotally secured to the post 56 and extend toward the adjacent rear wheel 22 of the tractor where they are pivotally connected to a second vertical member 60 which is in turn pivotally connected to a push rod 62. This push rod 62 is connected in a conventional manner to the brake (not shown) as viewed in FIG. 2.

The sleeve portion 40 of sleeve 30 also has a brake pedal arm 64 rigidly secured thereto and extending in a parallel relationship to the brake pedal arm 54, as shown in FIG. 3. However, a post 66 for operating the brake on the right side of the tractor (not shown), as viewed in FIG. 2, is secured to the sleeve portion 42 on the opposite end of the center sleeve portion 44 from the sleeve portion 40. A pair of push-pull plate members 70 are pivotally secured to the lower free end of the post 66 and extend rearwardly of the tractor and terminate in a vertical member 72 pivotally secured thereto which is in turn pivotally connected to a push-pull rod 74. The push-pull rod 74 is connected to the right hand brake in a similar fashion as the push-pull rod 62 is connected to the left hand brake.

To maintain the right and left hand brakes in an operative position, the brake pedals 54 and 64 are biased upwardly by coil springs 76 and 78 respectively. The spring 76 embraces the collar 32 and the sleeve 36 and has one free end 80 in engagement with the stop plate 30 and the other free end 82 in engagement with the lower side of the brake pedal arm 54. Similarly the coil spring 78 embraces the sleeve 36 and the sleeve portion 40 of the sleeve 30 with one free end 84 bearing against the under side of the stop plate 30 and the other free end 86 bearing against the under side of the brake pedal 64. A stop plate 90 is provided above the brake pedals 54 and 64 intermediate their ends and is secured by a vertical bracket 92 to the frame of the tractor.

The third sleeve 48 is provided with a foot pedal 94 extending rearwardly and as shown in FIG. 5 is pivotally connected to a pair of links 96 extending downwardly and rearwardly which are in turn pivotally connected at their lower free ends to an arm 98 extending horizontally rearwardly. The rear free end of the arm 98 is integrally connected to a sleeve member 100 rotatably mounted on a shaft 102 which is mounted on the under side of the tractor by support brackets 104 at opposite ends thereof. An arm 106 extends upwardly from the sleeve 100 and is pivotally connected to a clevis 108 in turn connected to a push-pull rod 110, which is coupled at its free end to the clutch (not shown) of a tractor. To maintain the clutch pedal arm 94 in an inoperative upright position, a coil spring 112 is provided on the collar 34 and has a first free end 114 in bearing engagement with the under side of the stop plate 30, as shown in FIG. 3, and the other free end 116 in engagement with the under side of the clutch pedal 94. A stop member 120 is secured to the frame support member 104 and serves to limit the upward pivotal movement of the clutch pedal arm 94.

Thus it is seen that by the arrangement of the three sleeves 36, 39 and 48 on the single shaft 26, it has been possible to accommodate the brake and control assembly component parts for the tractor 12. By this arrangement, considerable savings in space has been accomplished with the use of a minimum number of parts which also tends to reduce maintenance cost and provide simplicity of operation of the brake and clutch control assembly.

In operation, the brake pedal arms 54 and 64 may be operated by one foot simultaneously or intermittently. The downward movement of the brake pedals will cause the push-pull rods 62 and 74 to move toward the front end of the tractor, as viewed in FIG. 2 causing the brakes to perform their braking action. In this regard it is noted that the upright members 60 and 72 are pivotally connected at their upper ends to the frame of the tractor 12. When the foot pressure on the pedals 54 and 64 is released, the springs 76 and 78 return the pedals to their inoperative position in engagement with the stop member 90. The clutch operation is obvious from the illustration of parts in FIG. 5 wherein the clutch pedal 94 when depressed causes the arm 98 to pivot downwardly and the upright arm 106 to the right pulling with it the push-pull rod 110 consequently disengaging the clutch (not shown). When pressure is released from the clutch pedal arm 94, the coil spring 112 biases the pedal upwardly into engagement with the stop 120.

The simplicity of the construction of the brake and clutch control assembly of this invention is in part made possible by the placement of the posts 56 and 66 in planes parallel with the brakes on the tractor on opposite sides thereof. Accordingly, the linkage between the posts 56 and 66 respectively is in substantially the same plane.

It is also noted that the length of the sleeve 48 is substantially equal to the length of the cutout opening 46 and additionally the opening 46 is of such a size that the sleeve 48 may be received within the portion 44 of the sleeve 30.

Some changes may be made in the construction and arrangement of my tractor-loader without departing from the real spirit and purpose of my invention, and it is my intention to cover by my claims, any modified forms of structure or use of mechanical equivalents which may be reasonably included within their scope.

I claim:

1. A tractor having powered support wheels at one end and steering support wheels at the other end, and a driver station so situated that the driver normally faces the end having the powered support wheels, each of said powered wheels having brake means and an engine for driving said powered wheels through a clutch assembly,
   a brake and clutch control assembly including a shaft extending transversely of the longitudinal axis of said tractor,
   a first sleeve rotatably mounted on said shaft,
   a second sleeve rotatably mounted on said shaft, said second sleeve including a substantially semicircular in cross section elongated portion with elongated circular in cross section end portions,
   a third sleeve mounted within said semicircular portion of said second sleeve and being exposed between the adjacent ends of said end sleeve portions,
   an arm secured to said third sleeve and extending outwardly between the adjacent ends of said end sleeve portions,
   an arm secured to said second sleeve longitudinally to one side of said semicircular portion,
   a post secured to said second sleeve longitudinally to the opposite side of said semicircular portion from said arm secured to said second sleeve,
   each of said sleeves being adapted to rotate on said shaft independently of the others,
   an arm secured to said first sleeve,
   each of said arms being adapted to be manually actuated to rotate said sleeves, and said arms connected to said first and second sleeves extending along one side of said tractor in closely spaced relation and the post on said second sleeve being positioned on the opposite side of said tractor,
   means for operatively connecting the first sleeve to one of said wheel brakes,
   means for operatively connecting the post on said second sleeve to the other of said wheel brakes, and
   means for operatively connecting said third sleeve to the clutch on said tractor.

2. The structure of claim 1 where said arms on said first and second sleeves have portions closely spaced to each other for engagement by one foot of the operator of the tractor.

3. The structure of claim 1 wherein said shaft is positioned under said tractor and said arm connected to said third sleeve extends along the opposite side of said tractor from said arms connected to said first and second sleeves.

4. The structure of claim 1 wherein the means connecting said first sleeve to said one brake lies in a plane substantially parallel to the plane of the longitudinal axis of said tractor and the means connecting the post on the second sleeve to said other brake also lies in a plane substantially parallel to the plane of the longitudinal axis of said tractor.

5. The structure of claim 1 wherein said semicircular portion forms an opening in the side of said second sleeve and said third sleeve has a length and diameter small enough to permit insertion and removal through said opening in said semi-circular portion of said second sleeve when said shaft is removed.

6. The structure of claim 1 wherein said arm and post secured to said second sleeve are connected to said end portions of said sleeve and said end portions have a smaller outer diameter which is substantially equal to the inner diameter of the semicircular portion of the second sleeve, said end portions are telescopingly and rigidly disposed in the opposite ends of said semicircular portion, and the outer diameter of said third sleeve is smaller than the inner diameter of the semicircular portion of said second sleeve to permit said second and third sleeves to rotate freely in spaced relationship on said shaft.

7. A tractor brake and clutch control assembly, comprising, an elongated shaft,
   support means connected to each end of said shaft,
   a first sleeve rotatably mounted on said shaft,
   a second sleeve rotatably mounted on said shaft, said second sleeve including a substantially semicircular in cross section elongated portion with elongated circular in cross section end portions,
   a third sleeve mounted within said semicircular portion of said second sleeve and being exposed between the adjacent ends of said end sleeve portions,
   an arm secured to said third sleeve and extending outwardly between the adjacent ends of said end sleeve portions, an arm secured to said second sleeve longitudinally to one side of said semicircular portion, a post secured to said second sleeve longitudinally to the opposite side of said semicircular portion from said arm secured to said second sleeve, each of said sleeves being adapted to rotate on said shaft independently of the others, an arm secured to said first sleeve, each of said arms being adapted to be manually actuated to rotate said sleeves, and said arms connected to said first and second sleeves extending along one side of said tractor in closely spaced relation and the post on said second sleeve being positioned on the opposite side of said tractor, means adapted to operatively connect said first sleeve to one wheel brake on a tractor, means adapted to operatively connect the post on said second sleeve to another wheel brake on a tractor, and means adapted to operatively connect said third sleeve to the clutch on a tractor.

8. The structure of claim 7 wherein said arms on said first and second sleeves have portions closely spaced to each other for engagement by one foot of the operator of a tractor.

9. The structure of claim 7 wherein said semicircular portion forms an opening in the side of said second sleeve and the opening in said semicircular portion is of such a size and the third sleeve has a length and a diameter small enough to permit insertion and removal through the opening formed by the semicircular portion when said shaft is removed.

10. The structure of claim 7 wherein said arm and post secured to said second sleeve are connected to said end portions of said sleeve and said end portions have a smaller outer diameter which is substantially equal to the inner diameter of the semicircular portion of the second sleeve, said end portions are telescopingly and rigidly disposed in the opposite ends of said semicircular portion, and the outer diameter of said third sleeve is smaller than the inner diameter of the semicircular portion of said second sleeve to permit said second and third sleeves to rotate freely in spaced relationship on said shaft.

References Cited by the Examiner

UNITED STATES PATENTS

| 1,735,929 | 11/1929 | Lyback | 180—6.24 |
| 2,187,658 | 1/1940 | Lane et al. | |
| 2,412,323 | 12/1946 | Conrad | 214—140 |
| 3,174,359 | 3/1965 | Rose | 74—562.5 |

FOREIGN PATENTS

| 447,309 | 10/1912 | France. |

BENJAMIN HERSH, *Primary Examiner.*

J. A. PEKAR, *Assistant Examiner.*